(12) United States Patent
Cudmore et al.

(10) Patent No.: US 10,233,804 B2
(45) Date of Patent: Mar. 19, 2019

(54) PARTICULATE FILTER

(71) Applicant: JAGUAR LAND ROVER LIMITED, Warwickshire (GB)

(72) Inventors: Stephen Cudmore, Coventry (GB); Jonathan Hartland, Coventry (GB); Jamil Khan, Coventry (GB); Ken Hansen, Coventry (GB)

(73) Assignee: JAGUAR LAND ROVER LIMITED, Coventry, Warwickshire (GB)

( * ) Notice: Subject to any disclaimer, the term of this patent is extended or adjusted under 35 U.S.C. 154(b) by 93 days.

(21) Appl. No.: 15/519,200

(22) PCT Filed: Sep. 16, 2015

(86) PCT No.: PCT/EP2015/071229
§ 371 (c)(1),
(2) Date: Apr. 14, 2017

(87) PCT Pub. No.: WO2016/058774
PCT Pub. Date: Apr. 21, 2016

(65) Prior Publication Data
US 2017/0241312 A1    Aug. 24, 2017

(30) Foreign Application Priority Data

Oct. 17, 2014    (GB) .................................. 1418438.6

(51) Int. Cl.
*F01N 3/02* (2006.01)
*F02B 43/10* (2006.01)
(Continued)

(52) U.S. Cl.
CPC ........... *F01N 3/035* (2013.01); *F01N 3/0222* (2013.01); *F01N 3/2828* (2013.01); *F02B 43/10* (2013.01);
(Continued)

(58) Field of Classification Search
CPC ...... F01N 3/0222; F01N 3/035; F01N 3/2828; F01N 2330/60; F01N 2510/068;
(Continued)

(56) References Cited

U.S. PATENT DOCUMENTS

2008/0110341 A1    5/2008    Ketcham et al.
2010/0263358 A1   10/2010   Chen et al.
(Continued)

FOREIGN PATENT DOCUMENTS

JP    2012210581 A    11/2012
WO   2008/060563 A2    5/2008

OTHER PUBLICATIONS

Combined Search and Examination Report under Sections 17 and 18(3) for Application No. GB1418438.6 dated Apr. 9, 2015.
International Search Report and Written Opinion of the International Searching Authority for International application No. PCT/EP2015/071229 dated Nov. 20, 2015.

*Primary Examiner* — Mark Laurenzi
*Assistant Examiner* — Dapinder Singh (57) ABSTRACT

A particulate filter (1) is provided having a first wall flow region (2) and a second flow through region (3). The filter is provided with a catalytic washcoat, whereby the filter can be used to remove both particulate matter and harmful gaseous emissions from an exhaust gas stream.

21 Claims, 5 Drawing Sheets

(51) Int. Cl.
*F01N 3/28* (2006.01)
*F01N 3/035* (2006.01)
*F01N 3/022* (2006.01)

(52) U.S. Cl.
CPC .... *F01N 2330/60* (2013.01); *F01N 2510/068* (2013.01); *F01N 2510/0682* (2013.01); *F01N 2570/16* (2013.01); *F02B 2043/103* (2013.01); *Y02A 50/2322* (2018.01)

(58) Field of Classification Search
CPC ......... F01N 2510/0682; F01N 2570/16; F02B 43/10; F02B 2043/103; Y02A 50/2322
USPC .... 60/274, 297, 311; 95/273, 274, 279, 282, 95/285, 286; 96/154; 55/524
See application file for complete search history.

(56) References Cited

U.S. PATENT DOCUMENTS

| | | | |
|---|---|---|---|
| 2010/0319332 A1* | 12/2010 | Jeske | B01J 23/40 60/311 |
| 2011/0252773 A1* | 10/2011 | Arnold | B01D 46/2429 60/297 |
| 2012/0097033 A1* | 4/2012 | Arnold | F01N 3/2803 95/285 |
| 2012/0124976 A1* | 5/2012 | Roberts | B01D 53/9477 60/299 |
| 2012/0304623 A1* | 12/2012 | Springer | F01N 3/101 60/274 |
| 2014/0238242 A1 | 8/2014 | He et al. | |
| 2015/0113965 A1* | 4/2015 | Wieland | F01N 3/0222 60/297 |

* cited by examiner

PARTICULATE FILTER

TECHNICAL FIELD

The present disclosure relates to a particulate filter and in particular, but not exclusively, to a particulate filter for a vehicle. Embodiments of the present invention relate to a particulate filter provided with a catalyst for reducing particulate matter and gaseous emissions from gasoline powered vehicles, for example gasoline powered cars. Aspects of the invention relate to a particulate filter, to an exhaust system, to a motor vehicle and to a method.

BACKGROUND

Internal combustion engines produce various gaseous emissions, as well as solid particulate matter emissions. In various jurisdictions the mass of certain gases emitted per kilometre travelled is regulated by emissions standards. For example, in the European Union, emissions standards specify maximum masses of carbon monoxide (CO), total hydrocarbons (CxHy), non-methane hydrocarbons and Nitrogen Oxides (NOx) that may be emitted per kilometre by vehicles powered by gasoline engines. Particulate matter emissions from gasoline powered vehicles were previously regulated only in terms of the maximum mass of particulate matter by European emissions standards. However, future standards will set limits on the allowable number of particles emitted by gasoline powered vehicles.

Most modern gasoline powered vehicles are fitted with a "three way" catalytic converter to catalyse reactions that convert the gases whose emissions are regulated to less harmful gases. A typical three way catalytic converter for use in a gasoline powered vehicle catalyses the following reactions:

I. Oxidation of carbon monoxide (CO) to produce carbon dioxide ($CO_2$): $2CO+O_2 \rightarrow 2CO_2$ II. Oxidation of unburned hydrocarbons ($C_xH_y$) to produce carbon dioxide ($CO_2$) and water ($H_2O$): $C_xH_y + (2x+y/2)/2 O_2 \rightarrow xCO_2 + (y/2)H_2O$ III. Reduction of Nitrogen Oxides ($NO_x$) to produce nitrogen ($N_2$) and oxygen ($O_2$): $2NO_x \rightarrow xO_2 + N_2$ A catalytic converter typically comprises a substrate having a plurality of narrow channels therethrough coated with a washcoat having particles of catalyst suspended therein. The narrow channels provide the converter with a high surface area to volume ratio. Furthermore, once dried, the washcoat typically provides a large surface area, which increases the area of catalyst that the exhaust gas is exposed to. The catalyst is typically a precious metal such as platinum, palladium, rhodium, or a mixture thereof. Washcoats sometimes further comprise an oxygen storage component, such as cerium oxide or zirconia. Such oxygen storage component either releases or takes in oxygen depending on the oxygen concentration in the exhaust gas. This helps to ensure that the oxygen concentration in the catalytic converter is at a level that allows both the oxidation and reduction reactions to take place efficiently.

As gasoline engines typically produce very small amounts of particulate matter, filters to remove particulate matter are not usually fitted to gasoline powered vehicles. However, to reduce particulate number emissions to the levels required by future emissions standards it may be necessary to fit particulate filters to gasoline powered vehicles.

Introduction of particulate filters onto gasoline powered vehicles could potentially cause a number of problems. For example, both particulate filters and catalytic converters cause additional back pressure to the internal combustion engine. This increases pumping losses, thereby decreasing the power that the engine can produce. It also causes a reduction in fuel efficiency, which may also cause an undesirable increase in carbon dioxide ($CO_2$) emissions and increases the likelihood of abnormal combustion events. This increase in back pressure is especially problematic in gasoline engines, because of the high air flow rate required. It is therefore desirable to produce catalytic converters and particulates filters for gasoline powered vehicles that reduce emissions of regulated gases and particulates to acceptable levels without causing a significant increase in back pressure.

Modern catalytic converters also suffer from various problems. For example, catalytic converters only function effectively in an optimum temperature range. Therefore, emissions of carbon monoxide, nitrogen oxides and unburned hydrocarbons may be significantly higher before the catalytic converter is heated up to its operating temperature. It is therefore desirable to produce catalytic converters that heat up faster to reduce emissions generated during catalyst light off.

Furthermore, the concentrations of the different gases emitted by gasoline powered vehicles vary under certain driving conditions. For example, when gasoline powered vehicles are driven at high speed and a high load is placed on the engine, the mass flow rate of exhaust gas is high, and the space velocity over the catalyst increases, which can reduce the conversion efficiency of regulated gaseous emissions such as nitrogen oxides. It is therefore desirable to produce a catalytic converter that increases the efficiency with which nitrogen oxides are converted when the mass flow rate of exhaust gas is high.

The precious metals used in catalytic converters are expensive. Accordingly, it is desirable to reduce the amount of precious metal needed in catalytic converters to produce a desired conversion efficiency.

The present invention aims to at least partially mitigate the problems described above.

SUMMARY OF THE INVENTION

Aspects of the invention are defined in the appended claims.

In accordance with an aspect of the present invention there is provided a particulate filter comprising:

an inlet end;

an outlet end; and a plurality of porous walls extending from the inlet end to the outlet end and defining a plurality of filter channels therebetween, the filter channels comprising a first region of plugged channels and a second region of unplugged channels, wherein:

the porous walls defining the plugged channels in the first region comprise a first catalyst loading arranged to provide a first oxygen storage capacity per unit volume; and the porous walls defining the unplugged channels in the second region comprise a second catalyst loading arranged to provide a second oxygen storage capacity per unit volume;

wherein the second oxygen storage capacity per unit volume is higher than the first oxygen storage capacity per unit volume.

In an optional embodiment the first catalyst loading may comprise one or more precious metals loaded in a first washcoat and the second catalyst loading comprises one or more precious metals loaded in a second washcoat, wherein the second catalyst loading comprises more washcoat per unit volume of the filter than the first catalyst loading.

In another optional embodiment the first and second catalyst loadings may each comprise one or more precious metals including rhodium, and the concentration of rhodium per unit volume of the filter is higher in the second region than the first region.

In another optional embodiment each of the first and the second catalyst loadings may comprise further precious metals in addition to rhodium, said further precious metals optionally comprising at least one platinum group of metal.

In another optional embodiment the concentration of said further precious metals per unit volume of the filter may be higher in the second catalyst loading than the first catalyst loading.

It will be understood that the features of the above described optional embodiments may cause the first oxygen storage capacity to be higher than the second oxygen storage capacity.

In an embodiment, a plurality of the channels in said first region may be plugged at a first longitudinal position and a plurality of the channels in said first region may be plugged a second longitudinal position, said first longitudinal position being closer to said inlet than said second longitudinal position. This forces exhaust gas that enters the channels in the first region to flow through the porous walls, creating a filter to remove particulate matter.

According to an embodiment said precious metals may be selected from the platinum group. In an embodiment said precious metals may comprise platinum, palladium, rhodium, or any combination thereof.

Optionally, said oxygen storage component comprises a rare earth metal. In an embodiment the rare earth metal may comprise cerium oxide.

According to an embodiment the first and second washcoats may each comprise a three-way catalyst.

According to an embodiment approximately 50% of the channels in said first region may be plugged at the first longitudinal position and approximately 50% of the channels in said first region may be plugged at the second longitudinal position, wherein all of the channels in the first region are plugged at either said first longitudinal position or said second longitudinal position.

In an embodiment the channels in the first region may have a quadrilateral cross section. According to a still further embodiment substantially all of the channels that are plugged at the first longitudinal position may be adjacent on all four sides to channels that are plugged at the second longitudinal position.

In a further embodiment the channels in the first region may have an ACT (Asymmetrical Cell Technology), hexagonal or octosquare cross section In an embodiment the second region may occupy between 5% and 20% of the filter channels.

In a further embodiment the second region may occupy between 20% and 50%, optionally between 20% and 95% of the filter channels.

According to an embodiment of the invention said second region may comprise a single, continuous region.

According to an embodiment a portion of said first region may enclose said second region and a portion of said first region may be enclosed by said second region.

According to an embodiment the precious metal loading in said first region and second region may be 2-150 g per cubic foot.

According to an embodiment the washcoat loading in said first region and said second region is between 0.2 g per cubic inch and 5 g per cubic inch.

According to an embodiment the thickness of the porous walls defining the channels may be between 20 and 330 microns.

According to an embodiment the mean pore size within said porous walls may be between 8 and 45 microns.

According to an embodiment of the invention the void fraction within said porous walls may be greater than 40%.

According to an embodiment said first longitudinal position may be located at said inlet and said second longitudinal position may be located at said outlet.

According to an embodiment the transverse cross section of the particulate filter may be rotationally asymmetrical.

A further aspect the present invention relates to an exhaust system including a particulate filter having a first, wall flow region and a second, flow through region enclosed within a housing having an inlet duct and an outlet duct, wherein the transverse position in of the second region of said particulate filter is offset from the transverse positioning of said inlet duct.

In an embodiment the transverse positioning of said second region may not overlap the transverse positioning of said inlet duct.

In an embodiment the position and orientation of said particulate filter within said housing is fixed. The position of said particulate filter within said housing may be fixed because the particulate filter is shaped asymmetrically so that it can only be inserted into the housing in one orientation. Such asymmetric shaping of the particulate filter may comprise a keyway or keyed region and said housing may include a corresponding keyed region or keyway.

In an embodiment the particulate filter used in the exhaust system may be a particulate filter as described above.

In a still further aspect the invention relates to a motor vehicle including a particulate filter as described above. In an embodiment the motor vehicle may be a vehicle powered by an internal combustion engine configured to burn at least one of gasoline, ethanol and compressed natural gas.

A still further aspect of the invention relates to a method of treating exhaust gas from a gasoline powered internal combustion engine comprising passing the exhaust gas through a particulate filter as described above.

In another aspect of the invention for which protection is desired there is provided a method performed on a particulate filter, comprising:

providing a particulate filter comprising an inlet end and an outlet end, said particulate filter having a plurality of generally parallel channels extending from said inlet to said outlet and a longitudinal axis parallel to said channels, wherein said channels are defined by porous walls, the channels in a first region are plugged at either a first longitudinal position or a second longitudinal position, said first longitudinal position being closer to the inlet than said second longitudinal position, and the channels in a second region are unplugged;

covering the channels in said second region at said inlet or said outlet;

performing a first coating pass of the first region comprising:

coating one of said inlet end and said outlet end of said particulate filter in a first liquid washcoat and applying a vacuum to said particulate filter to draw said liquid washcoat through said particulate filter; and allowing said first washcoat to dry;

uncovering the channels in the second region;

covering the channels in said first region at said inlet or said outlet; and performing a first coating pass of the second region comprising:

coating one of said inlet end and said outlet end of said particulate filter in a second liquid washcoat and applying a vacuum to said particulate filter to draw said liquid washcoat through said particulate filter; and allowing said second washcoat to dry;

uncovering the channels in said first region.

In a further embodiment the method may further comprise a second coating pass of the first region, wherein whichever of said inlet end and said outlet end was not coated in the first coating pass of the first region is coated in the second coating pass of the first region.

In a further embodiment the method may further comprise a second coating pass of the second region, wherein whichever of said inlet end and said outlet end was not coated in the first coating pass of the second region is coated in the second coating pass of the second region.

In a further embodiment, the transverse cross section of the particulate filter may have a rotationally asymmetrical transverse cross section, and the orientation of the particulate filter during manufacture is fixed by placing the rotationally asymmetrical filter into a correspondingly shaped holder.

In another embodiment the particulate filter may include a keyway or keyed region and the holder includes a corresponding keyed region or keyway, whereby the orientation of the filter within the holder is fixed by the engagement of said keyway and said keyed region.

In another embodiment the particulate filter may be asymmetrically shaped and the holder may have a corresponding asymmetric cross section to fix the orientation of the filter within the holder.

In a further embodiment of the above method: covering the channels in said first region at said inlet or said outlet; performing the first coating pass of the second region; and uncovering the channels in said first region, are performed before covering the channels in said second region at said inlet or said outlet; performing a first coating pass of the first region; and uncovering the channels in the second region.

In another aspect of the invention for which protection is desired there is provided a method performed on a particulate filter, the particulate filter comprising: an inlet end; an outlet end; and a plurality of porous walls extending from the inlet end to the outlet end and defining a plurality of filter channels therebetween, the filter channels comprising a first region of plugged channels and a second region of unplugged channels, the method comprising:

applying, using a technique other than a liquid washcoating technique, to the porous walls defining the plugged channels in the first region, a first catalyst loading to provide a first oxygen storage capacity per unit volume; and applying, using a technique other than a liquid washcoating technique, to the porous walls defining the unplugged channels in the second region, a second catalyst loading to provide a second oxygen storage capacity per unit volume;

wherein the second oxygen storage capacity per unit volume is higher than the first oxygen storage capacity per unit volume.

The first and second catalyst loadings may be applied by extrusion or by gaseous deposition.

According to some, but not necessarily all examples there is provided a method of manufacture of a particulate filter, comprising:

providing a particulate filter comprising an inlet end and an outlet end, said particulate filter having a plurality of generally parallel channels extending from said inlet to said outlet and a longitudinal axis parallel to said channels, wherein said channels are defined by porous walls, the channels in a first region are plugged at either a first longitudinal position or a second longitudinal position, said first longitudinal position being closer to the inlet than said second longitudinal position, and the channels in a second region are unplugged;

covering the channels in said second region at said inlet or said outlet;

performing a first coating pass of the first region comprising:

coating one of said inlet end and said outlet end of said particulate filter in a first liquid washcoat and applying a vacuum to said particulate filter to draw said liquid washcoat through said particulate filter; and allowing said first washcoat to dry;

uncovering the channels in the second region;

covering the channels in said first region at said inlet or said outlet; and performing a first coating pass of the second region comprising:

coating one of said inlet end and said outlet end of said particulate filter in a second liquid washcoat and applying a vacuum to said particulate filter to draw said liquid washcoat through said particulate filter; and allowing said second washcoat to dry;

uncovering the channels in said first region.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention are further described hereinafter, by way of example only, with reference to the accompanying drawings, in which.

DETAILED DESCRIPTION

Typical catalytic converters used to treat exhaust gas produced by gasoline-powered vehicles comprise a substrate having a plurality of parallel channels formed therethrough for allowing exhaust gas to pass through the core. Such channels are typically relatively narrow, so that a large surface area of the substrate contacts the exhaust gas as it flows through, thus giving the catalytic converter a high surface area to volume ratio. The inside of the channels is coated with a washcoat. Typically this is a three-way wash coat provided with precious metals that catalyse oxidation of carbon monoxide (CO) to produce carbon dioxide ($CO_2$), oxidation of unburned hydrocarbons ($C_xH_y$) to produce carbon dioxide ($CO_2$) and water ($H_2O$), and reduction of Nitrogen Oxides ($NO_x$) to produce nitrogen ($N_2$) and oxygen ($O_2$). In this way the exhaust gas is presented with a large surface area of catalyst to maximise conversion efficiency. The substrate is typically made from a ceramic material, although other materials may also be used.

Although particulate filters are not currently fitted to gasoline powered vehicles, they are widely used in diesel powered vehicles. A common design of particulate filter is the wall flow filter, which comprises a plurality of parallel flow channels defined by porous walls. All of the flow channels are plugged at either an inlet end or an outlet end, so that exhaust gas that flows through the wall flow filter must enter through the channels that are unplugged at the inlet end and pass through the porous wall to enter a channel that is unplugged at the outlet end. The filtering of particulates takes place as the exhaust gas passes through the porous walls of the wall flow filter. Typical wall flow filters have channels with a generally square cross section which are plugged at either the inlet end or the outlet end in a "checkerboard" pattern, so that all channels that are plugged at the inlet are surrounded on all four sides by channels that are plugged at the outlet, and vice versa. Such filters produce excellent filtration efficiency, at a back pressure that is acceptable in diesel engines.

In a diesel exhaust system a particulate filter is generally provided in addition to one or more separate catalytic converters. Removal of soot from diesel particulate filters is achieved by periodically increasing the temperature of the particulate filter so that the soot stored in the particulate filter is burned. Such periodic increasing of the filter temperature is called a regeneration cycle, and is controlled by an engine management computer. If the soot loading on a diesel particulate filter becomes too high before a regeneration cycle can be successfully completed then the engine management computer may prevent the vehicle from running to prevent damage to the vehicle.

Figure 1A:
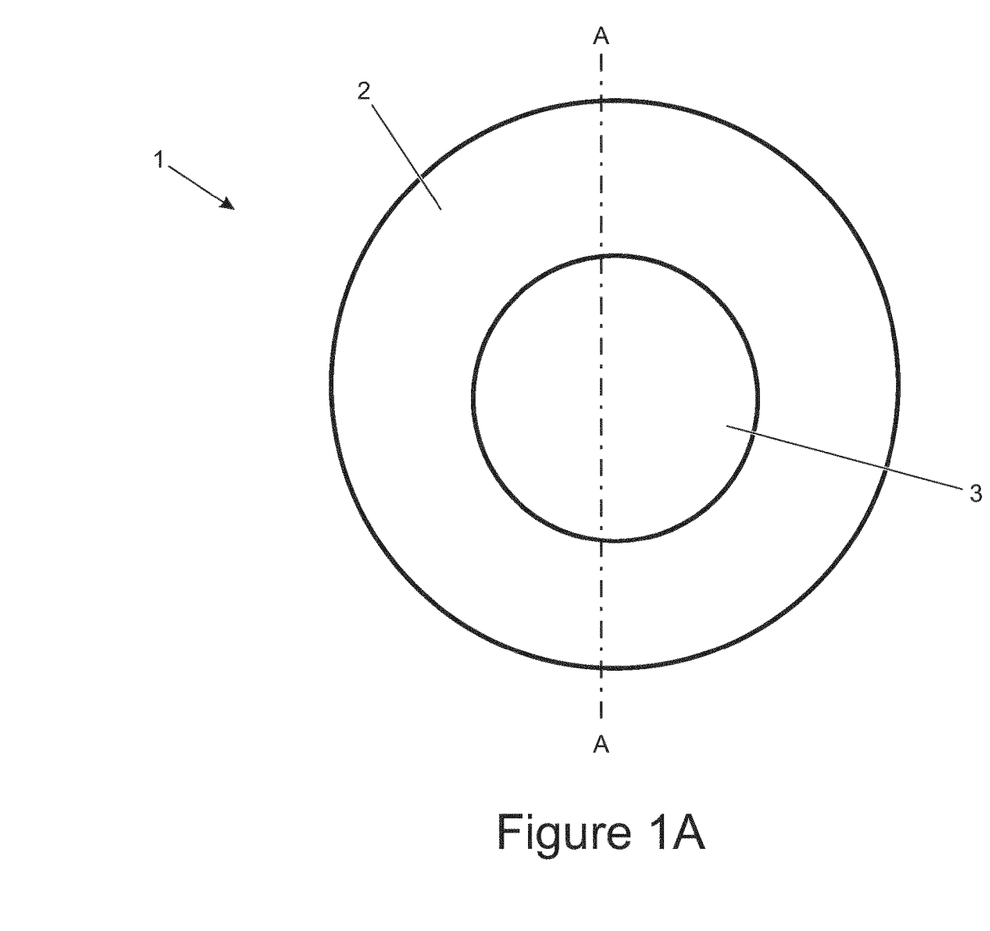
FIG. 1A shows a particulate filter according to an embodiment of the present invention.

FIG. 1A shows an inlet face of a particulate filter 1 including first and second catalyst loadings to provide a combined particulate filter and catalytic converter according to an embodiment of the present invention. The inlet of filter 1 is provided with a first, wall flow region 2 and a second, flow through region 3. The first catalyst loading is provided in the wall flow region 2, and the second catalyst loading is provided in the flow through region 3. The first catalyst loading provides a first oxygen storage capacity per unit volume and the second catalyst loading provides a second oxygen storage capacity per unit volume, the second oxygen storage capacity being higher than the first oxygen storage capacity.

Figure 1B:
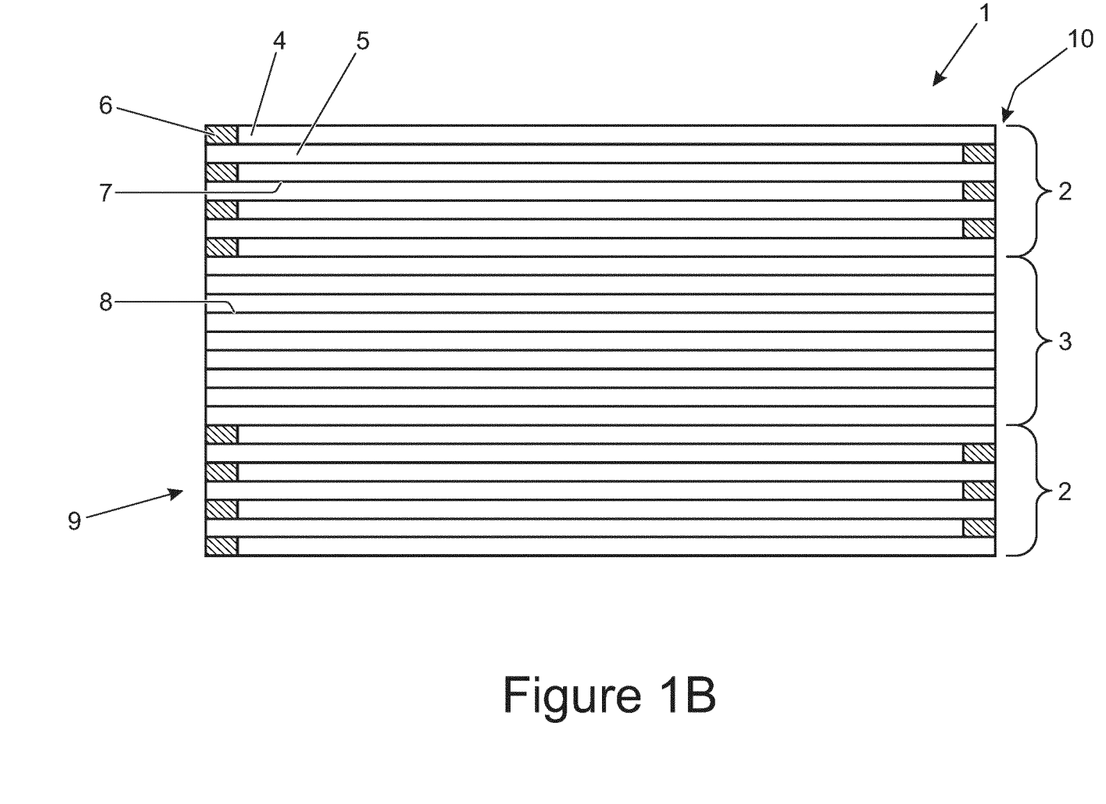
FIG. 1B shows a cross sectional view along line A-A of the particulate filter shown in FIG. 1A.

FIG. 1B shows a longitudinal cross section of filter 1 taken on centreline A. Each region 2,3 comprises a plurality of parallel channels 4,5,8 defined by porous walls 7. Channels 8 in the flow through region 3 are unplugged, and therefore provide a continuous flow path through the filter. The channels in wall flow region 2 are plugged to promote exhaust gas incident on the wall flow region to flow through the porous walls 7. In the illustrated embodiment channels 4,5 in wall flow region 2 are blocked by plugs 6 at inlet end 9 or outlet end 10 respectively. Channels 4,5,8 may be quadrilateral, for example square, in cross section. Alternatively, channels 4,5,8 may have an ACT (Asymmetrical Cell Technology), hexagonal or octosquare cross section. If the channels in wall flow region 2 have a quadrilateral cross section, then channels 4, which are plugged at the inlet end, are preferably adjacent on all four sides to channels 5, which are plugged at the outlet end. In this way the channels in wall flow region 2 form a "checkerboard" pattern.

Exhaust gas entering channels 5 must pass through porous walls 7 to enter an adjacent channel 4 to pass through the filter, and particulate matter suspended in the exhaust gas is at least partially removed as the exhaust gas passes through porous wall 7. The inclusion of flow through region 3 advantageously reduces the back pressure caused by the inclusion of the filter. This allows the possibility of trading off particulate filtration efficiency against back pressure by varying the proportion of cells that are unplugged, from about 5% of the channels to about 95% of the channels. This is especially useful in gasoline powered vehicles, because the particulate matter emissions produced by unfiltered gasoline engines are low, and an increase in back pressure to a gasoline engine can have a significant adverse effect on both the power produced by the engine and fuel efficiency. For example, it may be desirable to filter particulate matter from exhaust gas emitted by a gasoline engine having relatively high particulate emissions with a filtration efficiency of between 50% and 75%. Between 5% and 20% of the channels in a filter produced according to the present invention may be unplugged to achieve such a filtration efficiency. Gasoline engines having relatively low particulate emissions may require lower filtration efficiency, and accordingly between 20% and 50%, in some cases between 20% and 95% of the channels may be unplugged in a filter designed to treat exhaust gas from a gasoline engine having relatively low particulate emissions.

The thickness of walls 7, as well as their porosity in terms of the void fraction (i.e. the proportion of the volume of the porous wall that is not occupied by solid material) and the pore size distribution, significantly affects the pressure drop through wall flow region 2, and therefore the proportion of the gas that enters wall flow region 2 rather than flow through region 3. The porosity and thickness of walls 7 also affects the filtration efficiency achieved by wall flow region 2. At least some of the pores in walls 7 must be small enough to trap the particulate matter that the filter is designed to remove. In a preferred embodiment the particulate filter of the present invention is configured to remove particulate matter from the exhaust gas emitted from a gasoline engine having a mean particle size of approximately 40-90 nm. However, it is not necessary for the pores in walls 7 to be smaller than the size of the particles to be filtered.

Particulates may be removed by deep-bed filtration, which includes filtration mechanisms such as inertial deposition, flow line interception and diffusional deposition. In general, deep-bed filtration causes particles to become trapped when they impact on the walls of the filter or lose momentum as they follow a tortuous path through the filter. This differs from cake filtration, in which particles are trapped in pores that of smaller dimension than the particles themselves. Use of deep-bed filtration advantageously reduces the back pressure caused by the filter. A suitable mean pore size for removing particulates emitted by a gasoline engine by deep-bed filtration may be between 8 and 45 microns, with a void fraction of >40%, and a wall thickness of between 20 and 330 microns.

First and second catalyst loadings may be provided as part of a first or second catalytic washcoat. These washcoats comprise small particles of one or more precious metals, preferably metals selected from the platinum group, and an oxygen storage component. The catalytic washcoats both preferably include a three-way catalyst suitable for catalysing oxidation of carbon monoxide, oxidation of unburned hydrocarbons and reduction of nitrogen oxides. In one embodiment the precious metals comprise rhodium, platinum and palladium and the oxygen storage component comprises cerium oxide or another rare earth metal such as zirconia. Rhodium and platinum catalyse the reduction reactions and palladium and platinum catalyse the oxidation reactions. In other exemplary embodiments the precious metal may comprise platinum palladium, rhodium, or any combination thereof.

It is necessary to provide an oxygen storage component because the reduction reactions are only catalysed efficiently when the oxygen concentration is low, whilst the oxidation reactions are only catalysed efficiently at high oxygen concentration. Provided the oxygen concentration varies cyclically around a concentration at which both oxidation and reduction are efficiently catalysed, the oxygen storage component either removes oxygen (if the oxygen concentration is too high) or releases oxygen (if the oxygen concentration is too low). Such variation of the oxygen concentration is generally controlled by the engine management computer. The oxygen concentration depends on the air/fuel ratio, with rich air/fuel mixtures containing more fuel and therefore proportionally less oxygen than lean air/fuel mixtures.

Both the precious metal and the oxygen storage component are preferably suspended in a washcoat carrier having a very high surface area, thereby potentially increasing the surface area of the precious metal and oxygen storage component that contacts exhaust gas flowing through the filter. Suitable washcoat carriers include, but are not limited to, aluminium oxide and silicon dioxide.

Washcoats, which are used in the illustrated example to provide the first and second catalyst loadings, are typically defined by the washcoat loading, typically measured in mass of washcoat per unit volume of the substrate, the precious metal loading, measured by the mass of precious metal per unit volume of the substrate (eg grams per cubic foot), and the oxygen storage capacity, measured as either the maximum mass of oxygen stored per unit volume of the substrate or mass of the oxygen storage component per unit volume of the substrate. In the context of catalysed particulate filters of the present invention the substrate may comprise the filter before the application of washcoat.

As described above, the catalyst loading on filter 1 may comprise a first washcoat in first region 2 and a second washcoat in second region 3. In some embodiments the second washcoat has a higher washcoat loading than the first washcoat. A washcoat having a higher loading may provide a larger surface area, because of the porosity and roughness of the washcoat. As described above, the second washcoat provides a higher oxygen storage capacity per unit volume of the filter than the first washcoat. This advantageously increases the gaseous conversion efficiency when exhaust gas flows through the second region at higher space velocity than the first region. The proportion of the flow that enters the second region is higher than the proportion of the filter that the second region comprises. Providing a higher oxygen storage capacity in the second region therefore increases the gaseous conversion efficiency that can be provided by a given mass of washcoat. This may reduce the overall mass of precious metals required to produce a given conversion efficiency. In an exemplary embodiment the precious metal loading in the first region may be 2-150 g per cubic foot. The concentration of the oxygen storage component in the first and second washcoats may also be varied or kept constant. In an exemplary embodiment the concentrations of precious metal and oxygen storage component in the first and second washcoats may be the same, and the washcoat loading in the first region may be 1.6 g per cubic inch and the washcoat loading in the second region may be 3.2 g per cubic inch, with a precious metal loading of 25 g per cubic foot in the first region and 50 g per cubic foot in the second region. In an alternative embodiment the quantity of precious metals in the second washcoat per unit volume of the washcoat may be lower than that in the first washcoat, but the washcoat loading in the second region may be higher in the second region than the first region, resulting in a similar precious metal loading in the first and second regions. In any event, the washcoat loading in the first region must be selected to ensure that the pores in walls 7 that define the channels in wall flow region 2 are not blocked. However, as exhaust gas is unlikely to pass through walls 7 in flow through region 3, the washcoat loading in the second region may block the pores in walls 7 that define flow through region 3.

The skilled person will understand that the oxygen storage capacity of a catalysed filter depends on a number of factors, including the concentration of the oxygen storage component per unit volume of the filter, the ratio of the surface area of the oxygen storage component to the volume of the filter, and the concentration of precious metals. In particular, the skilled person will understand that the concentration of Rhodium may increase the available oxygen storage capacity of a given concentration of oxygen storage component.

The skilled person will further understand that the oxygen storage capacity of a catalysed filter can be easily determined, either by using standard experimental procedures or based upon the composition of the catalyst. For example, the filter may be placed in a steady stream of exhaust gas of known and constant oxygen concentration, and the oxygen concentration and space velocity may be continuously monitored in the first and second regions of the filter. In this way it is possible to determine a measure of the oxygen storage capacity in the first and second regions, as the amount of gas flow required for the oxygen concentration to reach a steady state, at which point the oxygen storage component has become saturated, is related to the oxygen storage capacity. Such a test may be performed with the filter attached to a vehicle, or on a synthetic gas test bench. Performing the tests on a test bench allows one or other of the regions to be blocked, thereby allowing the oxygen storage capacity of each region to be determined independently. The use of a test bench may also make control of the composition of the stream of gas more straightforward.

The loading and composition of the washcoat in the first and second regions are optimised based on the flow split between the flow through region and the wall flow region. A higher loading of the oxygen storage component may be provided in the flow through region, as this is where the overall flow velocity is highest. This may reduce the breakthrough of unreacted carbon monoxide and hydrocarbons. Breakthrough of unreacted hydrocarbons and carbon monoxide from a gasoline powered motor vehicle is most likely to occur when the air/fuel ratio is rich of stoichiometric (i.e. the mixture contains more fuel than is necessary for stoichiometric combustion). The air/fuel ratio may be rich during normal lean/rich cycling. The engine management computer may also set a rich air/fuel ratio in response to a deceleration fuel cut, because the lean operation during the deceleration fuel cut causes the oxygen storage component to fill up, so a period of rich operation is needed to consume the stored oxygen.

First and second washcoats may be applied in the first and second regions 2, 3 by a variety of known methods. For example, the channels at a first end of the filter may be submerged in washcoat, and the washcoat may be drawn into the channels by applying a vacuum to a second end of the filter opposite the first end, so that the washcoat is drawn into the channels. The filter may then be inverted before the procedure is repeated to ensure that the washcoat enters all of the channels and provides an even coating throughout the region of the filter to be coated. Alternatively, a predetermined quantity of washcoat may be placed into a containment means located at a first, upper end of the filter and a vacuum may be applied at a second, lower end of the filter to draw the washcoat into the channels, before inverting the filter, relocating the containment means to the second end of the filter and repeating the procedure. When washcoat is to be provided selectively in a first or second region of the filter then either of the above procedures may be followed, but a temporary mask may be provided to cover the entrances to the channels that the washcoat is not required in, so that little or no washcoat enters such channels.

The gaseous conversion performance of a catalytic converter is significantly worse when it is cold, as is the case soon after an engine whose emissions the converter is configured to treat is started. The performance then significantly improves once the hot exhaust gas has heated the catalytic converter to a temperature at which the precious metals in the washcoat are able to function efficiently as catalysts. Once part of the washcoat is hot enough to function as a catalyst the temperature in the catalytic converter increases rapidly, because the reactions that take place within the catalytic converter have an overall exothermic effect, and therefore heat up the catalytic converter. This phenomenon is known as "light off".

Combined particulate filters and catalytic converters produced in accordance with the present invention advantageously light off more quickly after hot exhaust gas begins flowing through them compared to conventional catalytic converters. This is because the inclusion of flow through region 3 causes a non-uniform flow distribution, with a higher space velocity in flow through region 3 than in wall flow region 2, which causes flow through region 3 to heat up more quickly than wall flow region 2. Flow through region 3 also heats up more quickly than any region in a conventional catalytic converter of equivalent area that includes only flow through channels similar to those in region 3, because that configuration results in a substantially uniform flow distribution over the cross section of the converter, so the entire converter heats at a substantially uniform rate. Once flow through region 3 has heated up the exothermic reactions that are catalysed by the washcoat quickly cause the rest of the filter to heat up, so that the entire filter efficiently converts gaseous emissions. This quicker light off may reduce emissions of regulated gases, as a large proportion of the emissions of regulated gases emitted from a gasoline powered vehicle are released before catalyst light off.

Figure 2:
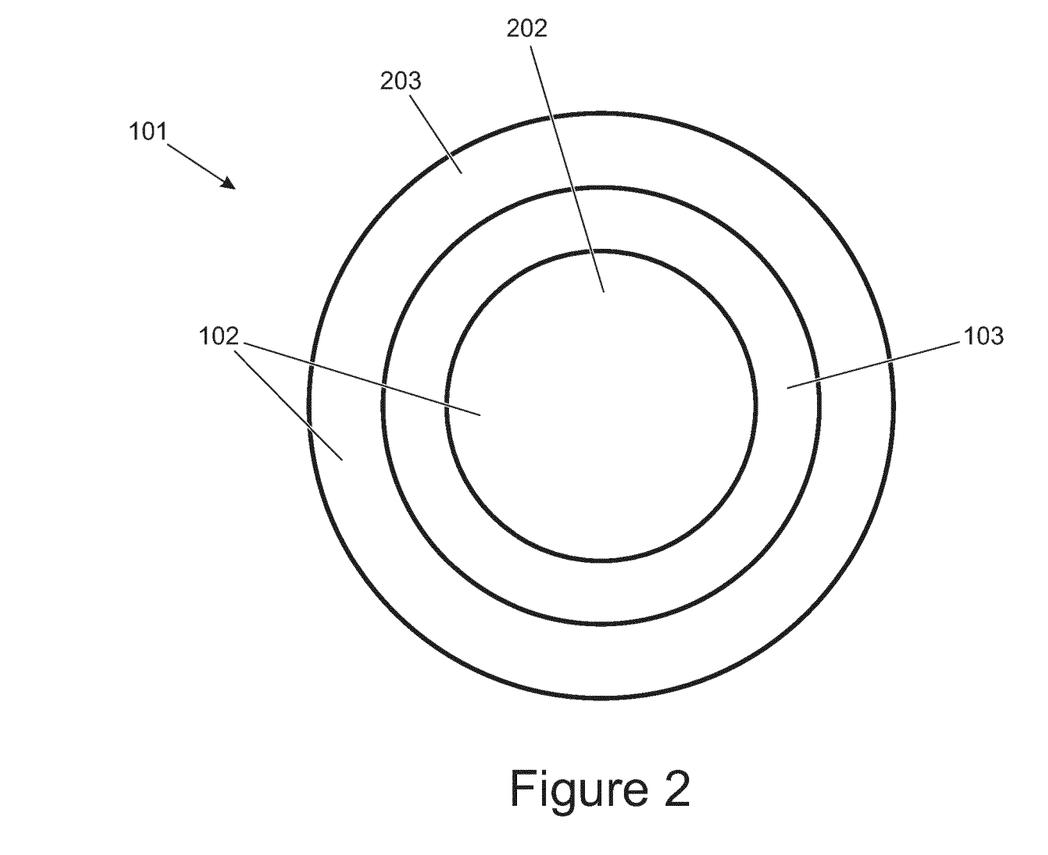
FIG. 2 shows a particulate filter according to an embodiment of the present invention.

FIG. 2 shows the inlet face of a particulate filter 101 provided with a catalytic washcoat in another embodiment of the present invention. In this embodiment the flow through region 103 comprises a ring of unplugged cells which encloses part 202 of the wall flow region and is enclosed by another part 203 of the wall flow region 102. Providing the flow through region as a ring may cause the flow of exhaust gas through the wall flow region 102 to be more uniform, compared to the configuration shown in FIG. 1A, because the incoming flow must spread over a larger area to reach ring-shaped flow through region 103 compared with circular flow through region 3. Furthermore, because the distance between ring-shaped flow through region 103 and the furthest away portion of wall flow region 102 is shorter than the distance between circular flow through region 3 and the furthest away portion of wall flow region 2, the transfer of heat from ring-shaped flow through region 103 to the wall flow region 102 is faster than the transfer of heat from circular flow through region 3 to wall flow region 2. This further reduces the time taken for light off to occur.

Figure 3:
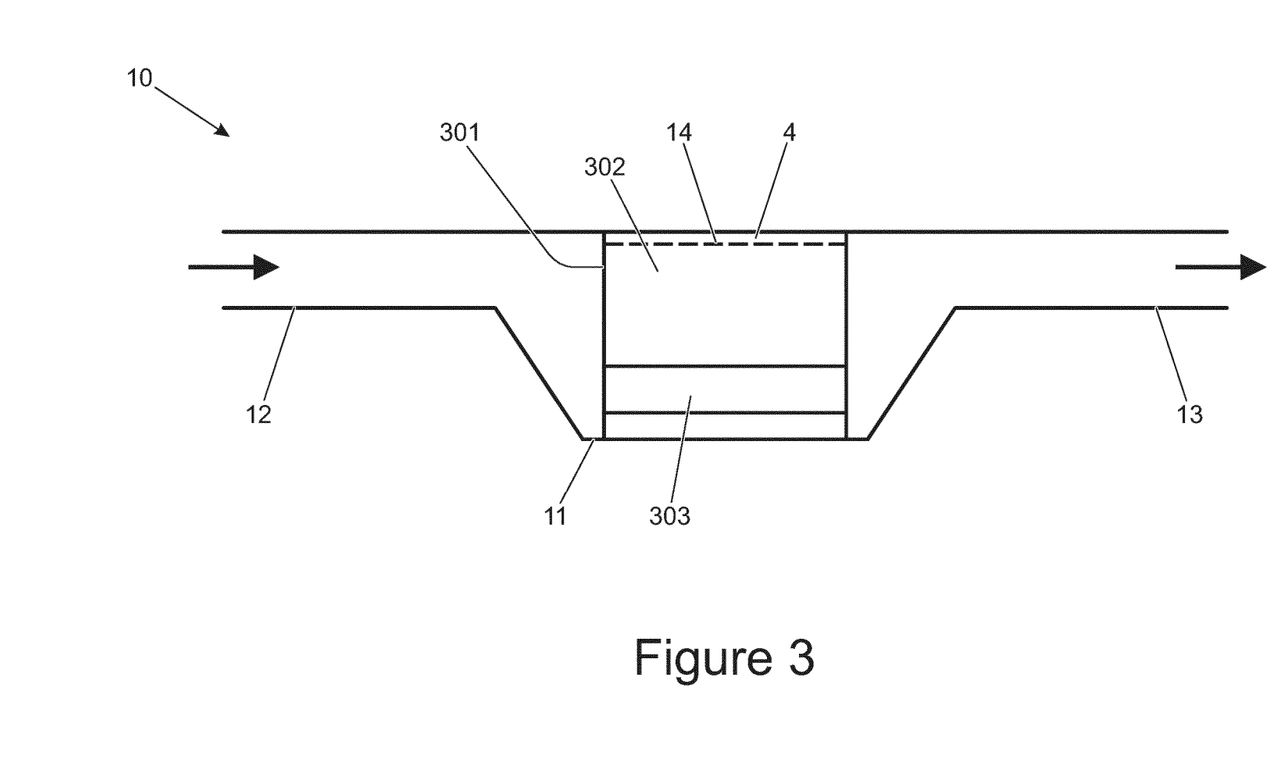
FIG. 3 shows a cross section of an exhaust system including a particulate filter according to an embodiment of the present invention.

FIG. 3 shows an exhaust system in an embodiment of the present invention. Exhaust system 10 includes a housing 11 that locates combined particulate filter and catalytic converter 301. Housing 11 further includes inlet duct 12, which receives exhaust gas from an internal combustion engine, preferably a gasoline powered internal combustion engine, and outlet duct, 13 which releases the exhaust gas to downstream components in the exhaust system once it has passed through combined particulate filter and catalytic converter 301. In the embodiment shown in FIG. 3 the transverse positioning of flow through region 303 is offset from the transverse positioning of inlet duct 12. In this way a significant proportion of the flow from inlet duct 12 is diverted to flow through region 303. This may increase the uniformity of the flow distribution through wall flow region 302, relative to a configuration in which the flow through region is a central circular region, because the reduction in pressure drop over the lower portion of filter 301 caused by flow through region 303 may counteract the effect of the momentum of the incoming exhaust gas, which would otherwise cause the flow rate to be higher in the upper portion of filter 301. To ensure that filter 301 remains in the desired orientation within housing 11 filter 301 is provided with a keyway or keyed region 4 on its outer surface, which is configured to engage a corresponding keyed region or keyway 14 on the inner surface of housing 11 when filter 301 is inserted into housing 11 in the desired orientation. In other embodiments (not shown in the drawings) the housing and the filter may be shaped such that the filter may only be inserted into the housing in a single predetermined orientation. In alternative embodiments the filter and the portion of the housing that is configured to receive the filter may be circular in cross section, and the flow through region may be rotationally symmetrical, so that it is unnecessary to control the orientation of the filter within the housing. In these embodiments the inlet duct may be concentric with the filter.

Keyway or keyed region 4 on the outer surface of filter 301 may advantageously be used during manufacturing to fix the orientation of filter 301 when applying the washcoat. If a mask is applied to prevent washcoat from entering certain channels then the use of keyway or keyed region 4 may enable the mask to be reliably and automatically positioned on the filter.

The shapes of housing 11 and inlet and outlet ducts 12, 13 in mass-produced vehicles are often determined by packaging requirements. It is therefore a particular advantage of the present invention that the position of flow through region 303 may be selected to optimise the flow distribution within any housing configuration. The substrate may therefore be shaped in such a way that it may only be inserted into a housing in one orientation, thereby ensuring that the flow through region is provided in a position that optimises the flow distribution.

In embodiments where the exhaust system 10 is used to treat exhaust gas from a gasoline powered engine it is anticipated that active regeneration is unlikely to be required. This is because gasoline engines produce significantly less particulate matter than diesel engines, so the time taken for the pores in wall flow region 302 to become blocked will be very high. Furthermore, it is expected that occasional increases in the mass flow rate of exhaust gas through filter 301, for example caused by rapid acceleration, will heat filter 301 sufficiently to burn any particulate matter trapped in filter 301, which may make active regeneration unnecessary under certain conditions. If such increases in mass flow rate do not occur, or if they are insufficient to heat filter 301 sufficiently to burn the particulate matter trapped therein, then active regeneration may be required to ensure that soot loading does not cause a reduction in emissions oxidation and reduction performance, and such active regeneration may be performed in a similar manner to that used to regenerate diesel particulate filters. It will be understood that active regeneration may be required at a lower soot loading than would typically be the case for a diesel particulate filter, as a high soot loading may cause a larger proportion of the flow to pass through flow through region 3, which may reduce the particulate filtration efficiency, and potentially the gaseous conversion efficiency, to unacceptable levels. The skilled person will understand that it may be necessary to ensure that the filter provides adequate gaseous conversion and particulate filtration efficiency for all soot loading conditions between the minimum and maximum soot loading that the filter is designed to encounter. Furthermore, the filter may be optimised so as to provide adequate filtration and gaseous conversion efficiency for a wide range of soot loading conditions, thereby increasing the acceptable soot loading range, and reducing the need for active regeneration.

Figure 4:
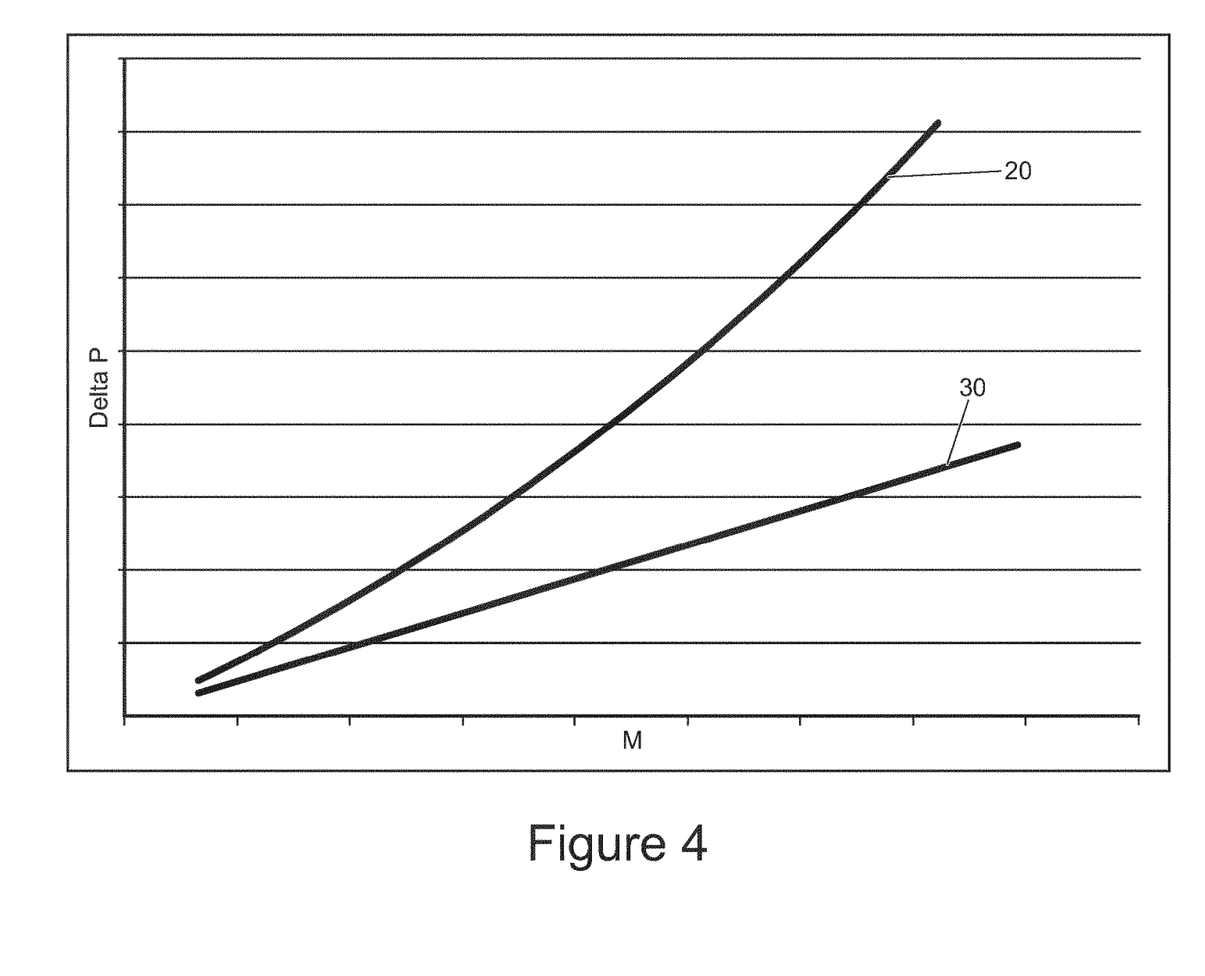
FIG. 4 is a graph of pressure loss vs average flow velocity in different sections of particulate filters produced according to embodiments of the present invention.

FIG. 4 shows the relationship between mass flow rate M and pressure drop ΔP over wall flow region 2 and flow through region 3 of a catalysed particulate filter produced in accordance with the present invention. Pressure profile 20 shows the relationship between mass flow rate and pressure drop over the wall flow region, and pressure profile 30 shows the relationship in the flow through region. Profile 20 shows a relatively linear relationship between pressure and mass flow rate at low mass flow rate. However, as mass flow rate increases further the rate of increase of pressure drop in wall flow region 2 with mass flow rate increases. No such increase can be observed for the relationship between pressure and mass flow rate in flow through region 3, as illustrated by profile 30. The flow split ratio between the flow through region and the wall flow region clearly depends on the pressure drop over each region; at a given mass flow rate through the entire filter the flow will split between the two regions so that the pressure drop is the same over both regions. Because the pressure drop over the wall flow region increases rapidly at high mass flow rate a higher proportion of the flow passes through the flow through region when the mass flow rate of exhaust gas is high, as is the case when a vehicle is being driven at high speed and a high load is placed on the engine. Under such conditions $NO_x$ control is particularly challenging due to the high space velocities. However, catalysed particulate filters according to the present invention divert a higher proportion of the exhaust gas to the flow through region, which is provided with a higher washcoat loading, when mass flow rate is high. The $NO_x$ rich exhaust gas is therefore exposed to more catalyst than would be the case in a conventional catalytic converter, so $NO_x$ emissions at high mass flow rate are reduced. In some embodiments the second region may be provided with a higher loading of precious metals that catalyse reduction reactions (e.g. rhodium and/or platinum) than the first washcoat to further improve the conversion of $NO_x$ at high mass flow rate.

The present invention has been described with respect to particular applications for treating exhaust gas from gasoline powered vehicles. However, it will be understood that embodiments of the invention could equally be used for treating exhaust gas from vehicles powered by a mixture of gasoline and other fuels, for example ethanol, or other fuels alone. The present invention is particularly suitable for use in treating exhaust gas from vehicles powered by fuels that produce relatively low levels of particulate matter, for example gasoline, liquid petroleum gas or compressed natural gas.

Although the plugs in the channels in the wall flow region have been described as located at either the inlet or outlet end, it will be understood that they could be spaced away from the inlet or outlet ends. Indeed, a wall flow filter may be produced provided some plugs are located closer to the inlet end than the others, with flow through the porous walls only occurring in the portion of the channels that is between the locations of the plugs.

Within the meaning of the present invention the terms "transverse" and "longitudinal" are used relative to the direction in which gas is expected to flow through a particulate filter of the present invention. "Transverse positioning" therefore refers to positioning in a plane normal to the direction in which gas would flow through a filter of the present invention, and a longitudinal position is a position along an axis parallel to the direction in which gas is expected to flow through a particulate filter of the present invention, i.e. parallel to the channels that extend from the inlet of the filter to the outlet of the filter.

The skilled person will understand that the space velocity in a given region of a filter refers to the volumetric flow rate through the region normalised by the volume of the region.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The method of applying the first and second catalyst loadings may comprise using techniques other than applying a liquid washcoating, for example gaseous deposition techniques, extrusion techniques, or the like may be used.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A particulate filter comprising:
    an inlet end;
    an outlet end; and
    a plurality of porous walls extending from the inlet end to the outlet end and defining a plurality of channels therebetween, the channels comprising a first region of plugged filter channels and a second region of unplugged channels, wherein:
    the porous walls defining the plugged channels in the first region comprise a first catalyst loading arranged to provide a first oxygen storage capacity per unit volume; and
    the porous walls defining the unplugged channels in the second region comprise a second catalyst loading arranged to provide a second oxygen storage capacity per unit volume;
    wherein the second oxygen storage capacity per unit volume is higher than the first oxygen storage capacity per unit volume.

2. A particulate filter as claimed in claim 1, wherein the first catalyst loading comprises one or more precious metals loaded in a first washcoat and the second catalyst loading comprises one or more precious metals loaded in a second washcoat, wherein the second catalyst loading comprises more washcoat per unit volume of the filter than the first catalyst loading.

3. A particulate filter as claimed in claim 1, wherein the first and second catalyst loadings each comprise one or more precious metals including rhodium, and the concentration of rhodium per unit volume of the filter is higher in the second region than the first region.

4. A particulate filter as claimed in claim 3, wherein each of the first and the second catalyst loadings comprise further precious metals in addition to rhodium, said further precious metals comprising at least one platinum group of metal, wherein the concentration of said further precious metals per unit volume of the filter is higher in the second catalyst loading than the first catalyst loading.

5. A particulate filter as claimed in claim 1, wherein the porous walls have a thickness of between 20 and 330 microns.

6. A particulate filter as claimed in claim 1, wherein the porous walls have a mean pore size between 8 and 45 microns.

7. A particulate filter as claimed in claim 1, wherein the porous walls have a void fraction greater than 40%.

8. A particulate filter as claimed in claim 1, wherein the second region occupies between 5% and 50% of the filter channels.

9. A particulate filter as claimed in claim 8, wherein the second region occupies between 5% and 20% of the filter channels.

10. A particulate filter according to claim 1, wherein the second region is a single, continuous region.

11. A particulate filter according to claim 1, wherein a portion of said first region encloses said second region and a portion of said first region is enclosed by said second region.

12. A particulate filter according to claim 1, wherein a cross section of the particulate filter is rotationally asymmetrical.

13. An exhaust system including
    a particulate filter as claimed in claim 1, wherein the second region having a transverse location;
    a housing arranged to house the particulate filter, the housing comprising an inlet duct having a transverse location;
    wherein the transverse location of the second region of the particulate filter is offset from the transverse location of the inlet duct.

14. The exhaust system of claim 13, the second region having a transverse area and the inlet duct having a transverse area, wherein the transverse area of the second region is offset from the transverse area of the inlet duct.

15. The exhaust system of claim 13, wherein a position and orientation of said particulate filter within said housing is fixed.

16. A motor vehicle comprising the particulate filter of claim 1, wherein the motor vehicle is powered by a combustion engine configured to burn at least one of gasoline, ethanol and compressed natural gas.

17. A method performed on a particulate filter comprising an inlet and an outlet, said particulate filter having a plurality of generally parallel channels extending from said inlet to said outlet and a longitudinal axis parallel to said channels, wherein said channels are defined by porous walls, the channels in a first region are plugged at either a first longitudinal position or a second longitudinal position, said first longitudinal position being closer to the inlet than said second longitudinal position, and the channels in a second region are unplugged, the method comprising:
    covering the channels in said second region at said inlet or said outlet;
    performing a first coating pass of the first region including coating one of said inlet end and said outlet end of said particulate filter in a first liquid washcoat and applying a vacuum to said particulate filter to draw said liquid washcoat through said particulate filter; and allowing said first washcoat to dry;
    uncovering the channels in the second region;
    covering the channels in said first region at said inlet or said outlet; and
    performing a first coating pass of the second region including coating one of said inlet end and said outlet end of said particulate filter in a second liquid washcoat and applying a vacuum to said particulate filter to draw said liquid washcoat through said particulate filter; and allowing said second washcoat to dry; and
    uncovering the channels in said first region.

18. The method of claim 17, comprising performing at least one of a second coating pass of the first region including coating whichever of said inlet and said outlet was not coated in the first coating pass of the first region; and a second coating pass of the second region, including coating whichever of said inlet and said outlet was not coated in the first coating pass of the second region.

19. A method as claimed in claim 17, wherein the particulate filter has a rotationally asymmetric transverse cross section and an orientation of the particulate filter during manufacture is fixed by placing the particulate filter into a holder.

20. A method performed on a particulate filter, an inlet end, an outlet end, and a plurality of porous walls extending from the inlet end to the outlet end and defining a plurality of channels therebetween, the channels comprising a first region of plugged filter channels and a second region of unplugged channels, the method comprising:

applying a first catalyst loading to the porous walls defining the plugged channels in the first region to provide a first oxygen storage capacity per unit volume; and applying a second catalyst loading to the porous walls defining the unplugged channels in the second region to provide a second oxygen storage capacity per unit volume;

wherein the second oxygen storage capacity per unit volume is higher than the first oxygen storage capacity per unit volume; and wherein the applying of the first and second catalyst loadings comprises a technique other than a liquid washcoating technique.

21. A method as claimed in claim 20, comprising applying the first and second catalyst loadings by extrusion or by gaseous deposition.

* * * * *